(12) United States Patent
Hooker et al.

(10) Patent No.: US 7,757,734 B2
(45) Date of Patent: Jul. 20, 2010

(54) TWO WHEELED DEVICE COVER

(76) Inventors: Leonard G. Hooker, 1536 Washington Ct., Mays Landing, NJ (US) 08330; Twanda Lanette Hooker, 1536 Washington Ct., Mays Landing, NJ (US) 08330

( * ) Notice: Subject to any disclaimer, the term of this patent is extended or adjusted under 35 U.S.C. 154(b) by 26 days.

(21) Appl. No.: 12/220,490

(22) Filed: Jul. 25, 2008

(65) Prior Publication Data

US 2010/0019532 A1 Jan. 28, 2010

(51) Int. Cl.
*B60J 7/20* (2006.01)
(52) U.S. Cl. .................. 150/167; 206/335; 296/78.1
(58) Field of Classification Search ........... 150/154, 150/167; 206/335; 296/78.1; 70/158, 233; 190/26
See application file for complete search history.

(56) References Cited

U.S. PATENT DOCUMENTS

| | | | | |
|---|---|---|---|---|
| 3,884,523 A | * | 5/1975 | Allen | 296/136.04 |
| 3,968,913 A | | 7/1976 | Weed et al. | |
| 4,356,831 A | | 11/1982 | Adams | |
| 4,598,725 A | * | 7/1986 | Brewer | 135/95 |
| 4,715,646 A | | 12/1987 | Goffi et al. | |
| 4,792,040 A | * | 12/1988 | Wagstaff, III | 206/223 |
| 4,944,340 A | | 7/1990 | Tortorich | |
| 5,193,724 A | | 3/1993 | Robbins | |
| D341,552 S | | 11/1993 | Schardt | |
| 5,282,502 A | | 2/1994 | Ballard | |
| 5,372,169 A | | 12/1994 | Norton et al. | |
| 5,445,200 A | | 8/1995 | Celestino et al. | |
| D361,977 S | | 9/1995 | Kahler | |
| D373,753 S | | 9/1996 | Ferguson | |
| 5,662,372 A | * | 9/1997 | Lubkeman | 296/136.04 |
| 5,676,288 A | * | 10/1997 | Spirk | 224/463 |
| D393,445 S | | 4/1998 | Nicholson | |
| 5,795,009 A | * | 8/1998 | Sack et al. | 296/78.1 |
| 6,040,764 A | * | 3/2000 | Crisci | 340/432 |
| 6,405,771 B1 | * | 6/2002 | Mote et al. | 150/167 |
| 6,876,297 B2 | * | 4/2005 | Krohn et al. | 340/427 |
| 2005/0247387 A1 | | 11/2005 | Hooker et al. | |
| 2005/0279436 A1 | * | 12/2005 | McMillen | 150/167 |

FOREIGN PATENT DOCUMENTS

WO   WO 97/10987   * 3/1997

* cited by examiner

*Primary Examiner*—Sue A Weaver
(74) *Attorney, Agent, or Firm*—The Law Firm of Andrea Hence Evans, LLC

(57) ABSTRACT

A protective cover for a two wheeled device protects bicycles, mopeds, motorcycles or the like. A lightweight material is sized to cover the device. The material has a top portion covering at least two handlebars and a seat on the device. An opening is located on the top portion and contains a cover support inside the opening. The cover support is sized to support the cover while the device is in use. Also, the opening may include the user's necessities and personal items the user desires to be stored in the cover.

12 Claims, 4 Drawing Sheets

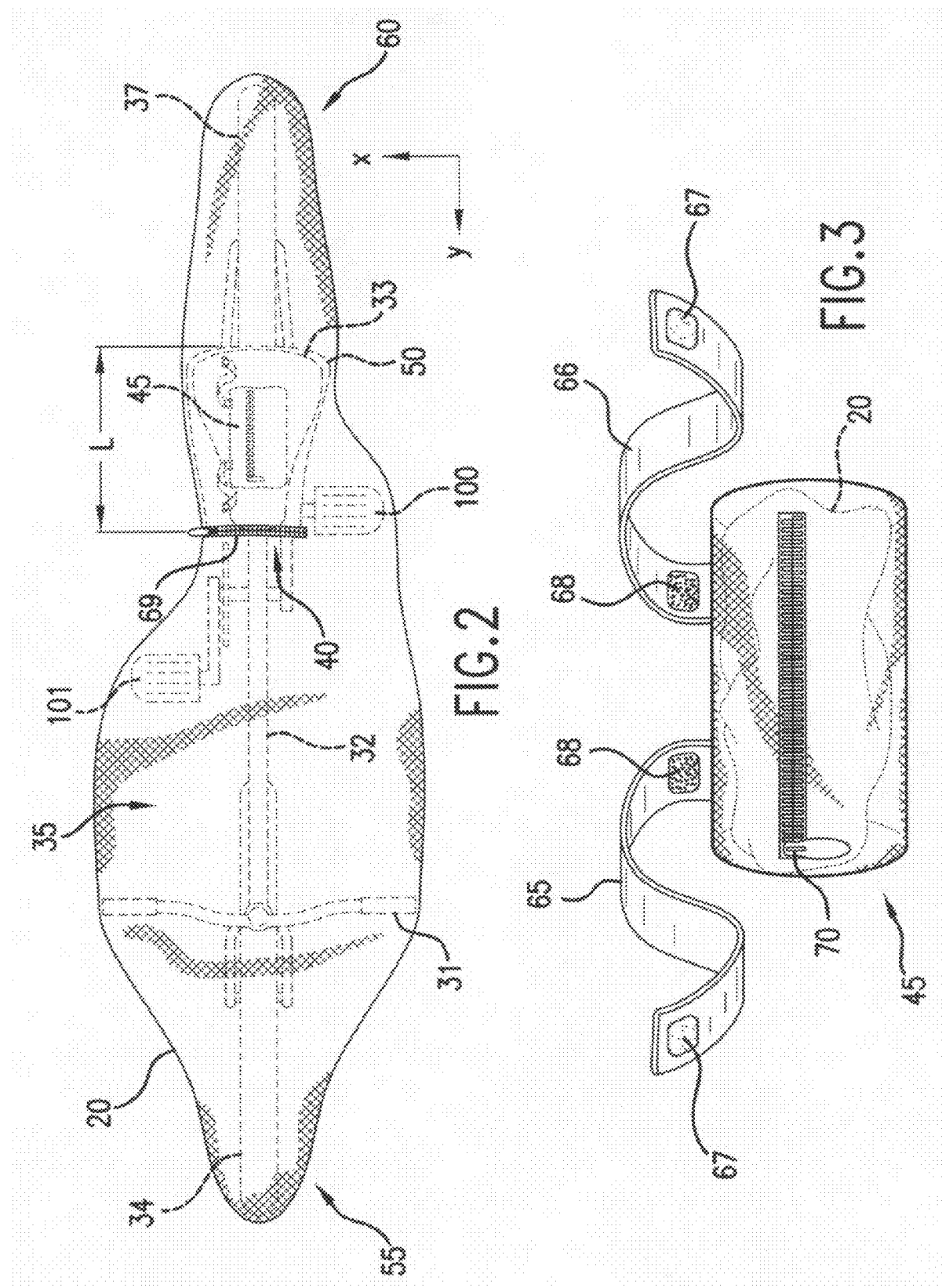

TWO WHEELED DEVICE COVER

FIELD OF THE INVENTION

The present invention relates to a cover for a two wheeled device. More specifically, the present invention relates to a bicycle protective cover that affords mounting on a vehicle and provides storage for a pouch and necessities.

BACKGROUND OF THE INVENTION

Two wheeled devices, such as bicycles, are an investment. Bicycles can cost a significant amount of money. Maintenance and repairs can also be costly. To preserve the life of the bicycles, owners have invested in bicycle covers.

Bicycle riders typically transport their bicycles by mounting the bicycles on their vehicles with a mounting rack on the top of the vehicle or the back of the vehicle. A drawback of current covers is that the covers do not provide stability during transport. Most covers are bulky and designed to be draped over the bicycle in the garage or other storage facility and are not designed for use when mounting the bicycle to a vehicle.

Furthermore, current covers do not provide a solution to the issue of removing and storing the cover while the bicycle is in use.

SUMMARY OF THE INVENTION

This invention introduces a protective cover for a bicycle or other two wheeled device. The cover comprises openings for easy mounting of the bicycle to a vehicle or non-mobile structure and also provides an area on the cover that houses a pouch that can support the cover while the bicycle is in use. The openings are symmetrical in that they are located in the same position on both sides of the cover. The rider's necessities can also be housed in the area that houses the pouch.

An aspect of an embodiment of the present invention provides a protective cover for a two wheeled device that prevents mold, mildew, and rust from damaging the device and helps to keep out dirt and elements while mounted to the vehicle or while stored in a structure.

A further aspect of an embodiment of the present invention provides a durable, easy to use protective cover that stays on the two wheeled device securely in the wind and rain or other climates that may cause damage to the device.

A further aspect of an embodiment of the present invention provides a protective cover that features an area on the cover that houses an object that can easily store the cover when it is removed from the bicycle.

BRIEF DESCRIPTION OF THE DRAWINGS

FIG. 2 illustrates a top view of an embodiment of the present invention.

FIG. 3 illustrates a pouch of the present invention.

DETAILED DESCRIPTION OF THE INVENTION

Figure 1:
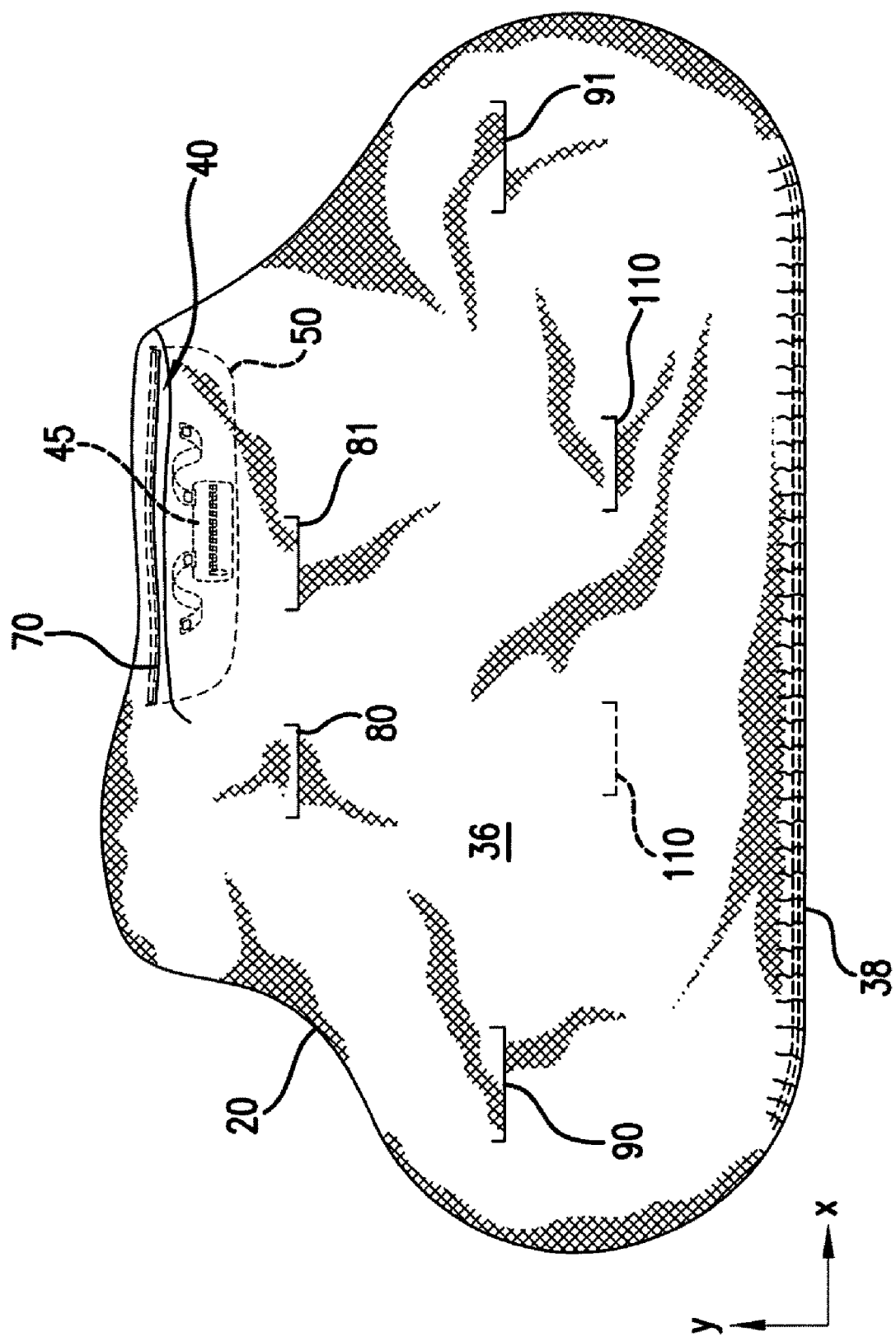
FIG. 1 illustrates a side view of an embodiment of the present invention.

FIG. 1 illustrates a side view of an embodiment of the present invention. The side 36 of a protective cover 20 for a two wheeled device such as a bicycle 30 (illustrated in FIG. 5) is shown. A bicycle is discussed for exemplary purposes only and it is understood that other two wheeled devices such as a motorcycle, moped or the like can be used with the protective cover 20. The protective cover 20 is a lightweight material such a nylon and spandex-lycra material blend. Other suitable water resistant, lightweight and stretchable materials may be used such as vinyl plastic, nylon or polyesters. The material may also be personalized as desired by the user with the user's name, favorite sports team or other designs that may better help the user identify its cover and also to give the cover a more personal appearance. The cover 20 is sized to cover the entire device 30.

As illustrated in FIG. 2, the top portion 35 of the cover 20 extends over the handlebars 31, crossbar 32, and bicycle seat 33. The front portion 55 of the cover 20 covers at least the handlebars 31 and the back portion 60 of the cover 20 covers at least the seat 33 of the device 30. The side portion 36 extends downwardly over the remaining portion of the bicycle including fully covering the wheels 34, 37. The bottom portion 38 is open such that the opening is large enough to fit around the entire bicycle 30 snuggly to prevent any dust or debris from damaging or dirtying the bicycle 30. Elastic is provided along the seams of the bottom portion 38 to provide a tailored and snug fit around the bicycle 30.

The top portion 35 contains an opening 40. The opening 40 forms the opening of a pocket 50 that can support at least one object. The pocket 50 is stitched along its sides and bottom area to the top panel 35 of the cover 20 substantially near the seat 33 of the bicycle 30. The pocket is at least as long L as the seat 33 of the bicycle. When items are placed into the pocket 50 while the cover is on the bicycle 30, the seat 33 of the bicycle acts as a base or support for the items. The items can be placed inside the pocket 50 and positioned with the seat 33 beneath the objects to further support them. For example, if the user desires to place a water bottle inside of the pocket 50 while the cover is on the bicycle, the user can place it standing upright, using the seat as a support and will not have to worry about the liquid inside of the water bottle spilling inside the pocket 50. Similarly, the opening 40 can alternatively be positioned on the side portion 36 of the bicycle instead of the top portion 35 of the cover 20. When on the side portion 36, the opening 40 is substantially centered on the cover 20 between the wheels 34, 37. The opening 40 on the side will also form the opening of a pocket 50 and the outline of the pocket will be stitched along the cover 20. The pocket can alternatively be positioned on the front or back of the cover. The opening 40 can be closed with a closure device known to those skilled in the art such as zippers, Velcro, buttons or hook and eye attachments. This closure device can be optional as the opening can remain open in the form of a slit. A zipper 69 is shown. This zipper can alternatively be positioned such that it extends along the entire length of the seat as shown in FIG. 1.

The opening 40 is at least 12 inches. This provides ample space for housing multiple objects. One object housed is a pouch 45 located inside the opening 40. The pouch 45 is sized to support the cover 20 while the bicycle 30 is in use. The bicycle is considered in use when the user desires to ride the bicycle. However, the pouch 45 can be used to store the cover 20 under any circumstance the user desires. The pouch 45 is also sized to store the user's personal items or riding necessities such as a towels, cell phone, pager, keys, or money. Other personal items or necessities may be stored in the pouch, as the aforementioned items are for example purposes only. Alternatively, the pocket 50 can store the user's personal items or necessities along with the pouch 45 when the cover 20 is on or off the bicycle 30. This will prevent the user from having to place the objects in the user's pockets or purse and can prevent misplacement of the items. If the user goes on a bicycle ride and dismounts his bicycle from his vehicle, often the user will leave these items in their vehicle and risk theft. However, the pocket 50 and the pouch 45 both act as storage separately for these items. Thus, the cover 20 of the present invention provides dual storage space. While the cover is covering the bicycle, the pouch 45 or the pocket 50 can be used as storage. When the cover 20 is removed from the bicycle 30, all storage items can be stored in the pouch and the pouch can be easily secured to the bicycle. A pouch is described for exemplary purposes only. It is understood that a bag, container, cover support or any other storage receptacle may be used to store the cover.

The opening 40 of the protective cover 20 may be a horizontal opening along the x-axis as shown in FIG. 2 or the opening may be a vertical opening (not shown) along the y-axis. The horizontal opening extends along the axis parallel to the handlebars 31. The vertical opening extends perpendicular to the handlebars 31. The size of the opening 40 can vary and is dependent upon the size of the pouch 45. The longer the pouch, the longer the opening will be so that the pouch can easily move in and out of the opening. Likewise, with a smaller pouch, a smaller opening may be provided.

FIG. 3 illustrates a pouch 45 of the present invention. The pouch 45 is made out of the same waterproof, lightweight and flexible material as the cover 20. The pouch 45 is folded and lays flat inside of the pocket 50. Once the user puts the cover 20 inside of the pouch 45, the pouch begins to fill out and its cylindrical shape can easily be seen. The pouch contains two pouch straps 65, 66 that are stitched onto the front portion 70 of the pouch 45. It is understood that other known techniques can be used to secure the straps 65, 66 to the pouch 45. The straps are at least long enough to be wrapped around the handlebars 31, the bar supporting the seat 33 or the cross bar 32 in order to secure the pouch 45 to the bicycle. Having the pouch 45 secured to the bicycle provides peace of mind to the user since their personal objects or items and cover remain with them during their bike ride. Each strap 65, 66 contains a Velcro, buckles or snap attachment. When the strap 65 is positioned on the bicycle where the user desires to attach it to the bicycle, the user can take the end of the strap 65 with a Velcro piece 67 and secure it to the Velcro attachment 68 on the strap 65. Both straps 65, 66 have identical attachment structures and strap 65 is discussed for exemplary purposes. Similarly, replacing the Velcro may be a snap attachment whereby a snap button is secured to one end of the strap and the snap attachment is on the opposite side of the strap. Also, a buckle mechanism may be provided similar to a belt buckle structure whereby the strap can be buckled around the bicycle in a location the user desires. The pouch's opening is on the front portion 70 of the pouch 45. The user can easily place the cover or its belongings inside of the pouch and close the pouch with a zipper, buttons, Velcro or a hook and eye closing mechanism. It is understood that alternative closing mechanisms known in the art may be used. Also, a locking structure may be added to the pouch to prevent unwanted entry into the pouch.

Figure 4:
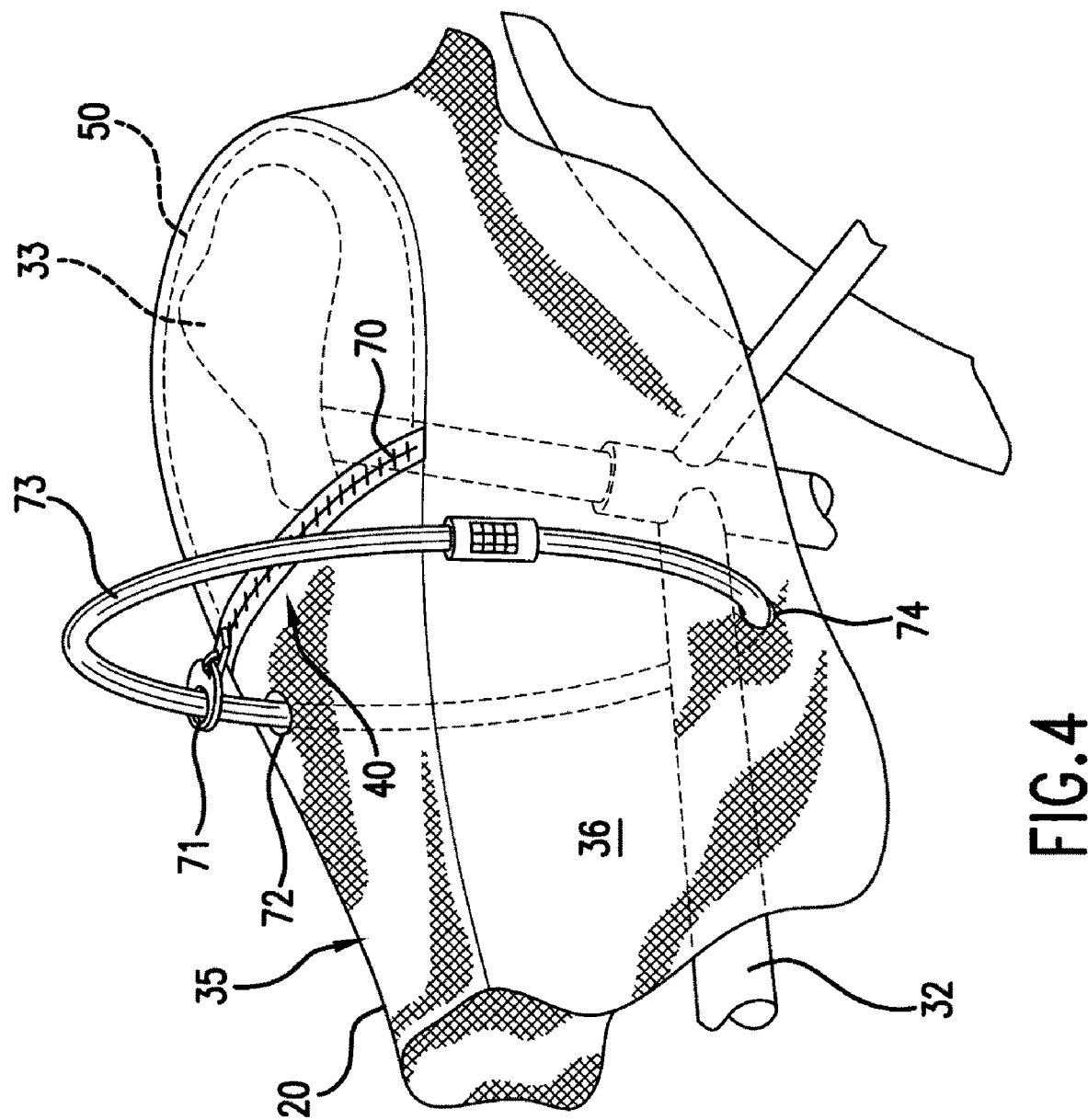
FIG. 4 illustrates the lock mechanism for the opening on the cover of an embodiment of the present invention.

FIG. 4 illustrates the lock mechanism for the opening 40 on the cover of an embodiment of the present invention. The zipper 70 is able to pivot about the edge of the cover 20. A lock hole 72 is located on the top portion 35 of the cover 20. A second lock hole 74 is positioned on the side portion 36 of the cover 20. A thin metal reinforcement can be placed around the hole for added reinforcement. The metal piece can be attached underneath the cover or on the top surface of the cover over the hole 72. The diameter of the metal piece is substantially the same size as the diameter of the lock holes 72. A cable lock 73 made of galvanized steel is fed through the eye 71 of the zipper 70 and through the lock holes 72 and 74. The cable lock is cut resistant. For added reinforcement, the cable lock 73 can be fished under the crossbar 32 and then through the lock hole 74. This lock 73 will deter unwanted removal of the cover and also secure the opening where the user will store its personal items and pouch.

Figure 5:
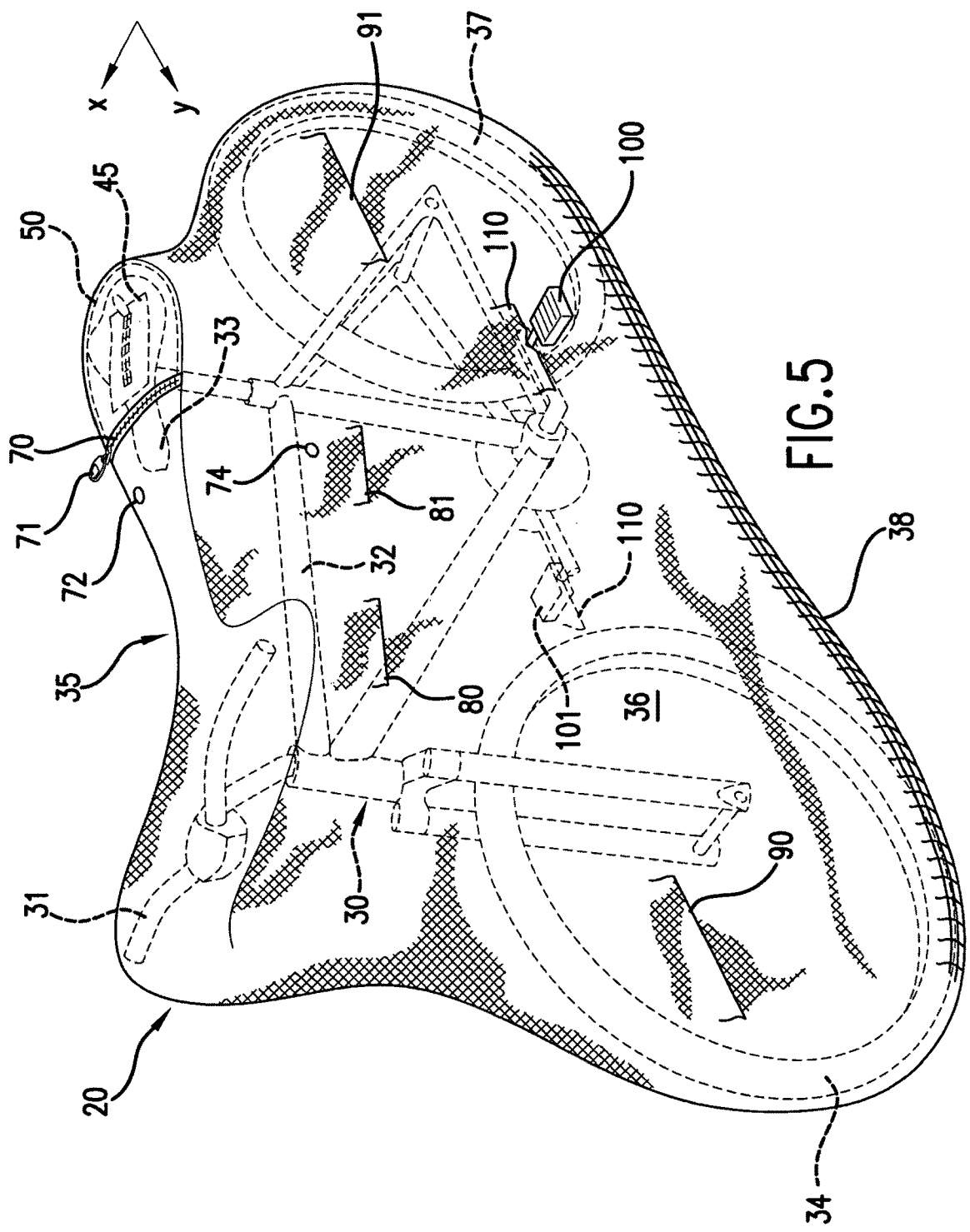
FIG. 5 illustrates a perspective view of the cover of an embodiment of the present invention covering a conventional bicycle.

FIG. 5 illustrates a perspective view of the cover 20 of an embodiment of the present invention covering a conventional bicycle 30. The cover 20 further features crossbar openings 80, 81 substantially aligned with a crossbar 32 when covered and wheel openings 90, 91 substantially aligned with the wheels 34, 37 on the bicycle 20 when covered. The crossbar openings 80, 81 and the wheel openings 90, 91 are symmetrical on the opposite side of the cover 20 so that a locking chain or a similar device can be inserted through the cover 20 for securing the bicycle during mounting or simply securing the cover 20 to the bicycle. Furthermore, the pedal openings 110 are substantially aligned with the pedals 100, 101 to provide an area where an additional locking chain can be placed through the cover 20. Like the crossbar openings 80, 81 and the wheel openings 90, 91, the pedal openings are symmetric and are located on the opposite side of the cover 20. The locking chains can be inserted through the entire width of the cover. Two way zippers, Velcro, buttons, and other closure mechanisms can be used to close the cover openings so that the openings remain open with a width to allow the locking chains to enter. This prevents additional dust and debris from harming the bicycle since the bicycle is minimally exposed to the elements during storage and transit.

The invention has been described in detail with particular reference to certain preferred embodiments thereof, but it will be understood that variations and modifications can be effected within the spirit and scope of the invention.

The invention claimed is:

1. A protective cover for a two wheeled device comprising: a lightweight material sized to cover the device, the material having a top portion covering at least two handlebars and a seat on the device; and an opening on the top portion, wherein the opening forms an opening of a pocket that is attached to the top portion and can support at least one object, and a pouch located inside the pocket, wherein the pouch is sized to support the cover while the device is in use.

2. The protective cover of claim 1 wherein the opening is horizontal.

3. The protective cover of claim 1 wherein the opening is vertical.

4. The protective cover of claim 1 wherein the material has at least one pedal opening substantially aligned with at least one pedal on the device when covered.

5. The protective cover of claim 1 wherein the pouch comprises straps that attach the cover to the device.

6. The protective cover of claim 1, wherein the pocket houses at least one object different from the pouch.

7. A protective cover for a two wheeled device comprising: a material sized to cover the entire device and an opening in the form of a vertical slit or horizontal slit on the material, wherein the opening forms an opening of a pocket attached to the material by a side and bottom area of the pocket and the pocket supports at least one object and a pouch, the pocket is substantially near a seat of the two wheeled device such that the seat acts as an additional support for the at least one object in the pocket, wherein the cover provides dual storage space with the pocket and the pouch.

8. The protective cover of claim 7 wherein the opening further comprises a closing mechanism.

9. The protective cover of claim 8 wherein the opening is substantially near the top of the material.

10. A protective cover for a two wheeled device comprising:
   a material sized to cover the device, the material having a top portion that extends over at least two handlebars, a cross bar and a seat on the device,
   an opening on the top portion of the material,
   a closing mechanism used to close the opening on the top portion of the material,
   a first lock hole on the top portion of the material and a second lock hole on a side of the material, and
   a locking mechanism, wherein the locking mechanism is threaded through the first lock hole, second lock hole and the closing mechanism to secure the unwanted removal of the cover and to secure the opening.

11. The protective cover of claim 10 wherein the opening forms an opening of a pocket, wherein the pocket can support at least one object.

12. The protective cover of claim 10, wherein the locking mechanism goes under the cross bar of the two-wheeled device to further reinforcement.

* * * * *